United States Patent
Donderici et al.

(10) Patent No.: US 9,091,785 B2
(45) Date of Patent: Jul. 28, 2015

(54) FIBEROPTIC SYSTEMS AND METHODS FOR FORMATION MONITORING

(71) Applicant: Halliburton Energy Services, Inc. ("HESI"), Duncan, OK (US)

(72) Inventors: Burkay Donderici, Houston, TX (US); Etienne M. Samson, Cypress, TX (US); Michel J. Leblanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 237 days.

(21) Appl. No.: 13/736,324

(22) Filed: Jan. 8, 2013

(65) Prior Publication Data

US 2014/0191120 A1    Jul. 10, 2014

(51) Int. Cl.
  *E21B 47/13* (2012.01)
  *G01V 8/20* (2006.01)
  *G01V 3/34* (2006.01)
  *E21B 47/12* (2012.01)

(52) U.S. Cl.
  CPC .............. *G01V 3/34* (2013.01); *E21B 47/123* (2013.01)

(58) Field of Classification Search
  CPC ........... G01V 3/34; G01V 8/20; E21B 47/123
  USPC .......................................... 250/254, 256, 265
  See application file for complete search history.

(56) References Cited

U.S. PATENT DOCUMENTS

| | | | |
|---|---|---|---|
| 4,090,141 A | 5/1978 | Leblanc | |
| 4,222,261 A | 9/1980 | Leblanc et al. | |
| 4,348,587 A | 9/1982 | Tangonan et al. | |
| 4,360,272 A | 11/1982 | Schmadel et al. | |
| 4,376,248 A | 3/1983 | Giallorenzi et al. | |

(Continued)

FOREIGN PATENT DOCUMENTS

| EP | 0212915 A2 | 3/1987 |
|---|---|---|
| EP | 0856753 A1 | 5/1998 |

(Continued)

OTHER PUBLICATIONS

Campanella, Humberto et al., "Comparative performance of static-mode ferrous MEMS gradiometers fabricated by a three-step DRIE process", Journal of Micromechanics and Microengineering, vol. 20 No. 4, (May 21, 2010), 10 pgs.

(Continued)

*Primary Examiner* — Mark R Gaworecki
(74) *Attorney, Agent, or Firm* — Krueger Iselin LLP; Anthony Iannitelli

(57) ABSTRACT

A formation monitoring system includes a casing. An array of electromagnetic field sensors is positioned in the annular space and configured to communicate with the surface via a fiberoptic cable. A computer coupled to the fiberoptic cable receives measurements from the array and responsively derives the location of any fluid fronts in the vicinity such as an approaching flood front to enable corrective action before breakthrough. A formation monitoring method includes: injecting a first fluid into a reservoir formation; producing a second fluid from the reservoir formation via a casing in a borehole; collecting electromagnetic field measurements with an array of fiberoptic sensors in an annular space, the array communicating measurements to a surface interface via one or more fiberoptic cables; and operating on the measurements to locate a front between the first and second fluids.

26 Claims, 4 Drawing Sheets

(56) References Cited

U.S. PATENT DOCUMENTS

| | | |
|---|---|---|
| 4,433,291 A | 2/1984 | Yariv et al. |
| 4,596,442 A | 6/1986 | Anderson et al. |
| 4,622,460 A | 11/1986 | Failes et al. |
| 4,868,495 A | 9/1989 | Einzig et al. |
| 4,918,371 A | 4/1990 | Bobb |
| 4,950,883 A | 8/1990 | Glenn et al. |
| 4,973,845 A | 11/1990 | Mastrippolito et al. |
| 4,996,419 A | 2/1991 | Morey et al. |
| 5,047,741 A | 9/1991 | Laskaris |
| 5,275,038 A | 1/1994 | Sizer et al. |
| 5,294,788 A | 3/1994 | Charon et al. |
| 5,305,075 A | 4/1994 | Bucholtz et al. |
| 5,317,576 A | 5/1994 | Leonberger et al. |
| 5,471,139 A | 11/1995 | Zadoff |
| 5,511,083 A | 4/1996 | D'Amato et al. |
| 5,513,913 A | 5/1996 | Ball et al. |
| 5,642,051 A | 6/1997 | Babour et al. |
| 5,691,999 A | 11/1997 | Ball et al. |
| 5,754,284 A | 5/1998 | Leblanc et al. |
| 5,804,736 A | 9/1998 | Klauder et al. |
| 5,844,927 A | 12/1998 | Kringlebotn |
| 6,188,712 B1 | 2/2001 | Jiang et al. |
| 6,271,766 B1 | 8/2001 | Didden et al. |
| 6,289,740 B1 | 9/2001 | Posey et al. |
| 6,294,917 B1 | 9/2001 | Nichols |
| 6,314,056 B1 | 11/2001 | Bunn et al. |
| 6,463,186 B1 | 10/2002 | Li |
| 6,534,986 B2 | 3/2003 | Nichols |
| 6,630,658 B1 | 10/2003 | Bohnert et al. |
| 6,724,469 B2 | 4/2004 | Leblanc |
| 6,731,114 B1 | 5/2004 | Lagabrielle et al. |
| 6,747,743 B2 | 6/2004 | Leblanc et al. |
| 6,809,516 B1 | 10/2004 | Li et al. |
| 6,957,576 B2 | 10/2005 | Skinner et al. |
| 6,961,601 B2 | 11/2005 | Matthews et al. |
| 7,077,200 B1 | 7/2006 | Adnan et al. |
| 7,151,377 B2 | 12/2006 | Chouzenoux et al. |
| 7,183,777 B2 | 2/2007 | Bristow et al. |
| 7,391,942 B2 | 6/2008 | Loock et al. |
| 7,477,160 B2 | 1/2009 | Lemenager et al. |
| 7,492,168 B2 | 2/2009 | Ogilvy et al. |
| 7,673,682 B2 | 3/2010 | Daily |
| 7,747,388 B2 | 6/2010 | Mombourquette et al. |
| 8,035,393 B2 | 10/2011 | Tenghamn et al. |
| 8,058,869 B2 | 11/2011 | Cranch et al. |
| 8,165,178 B2 | 4/2012 | Henderson |
| 8,379,438 B2 | 2/2013 | Tio Castro et al. |
| 8,380,439 B2 | 2/2013 | Lagmanson et al. |
| 2001/0023614 A1 | 9/2001 | Tubel et al. |
| 2003/0038634 A1 | 2/2003 | Strack |
| 2003/0057950 A1 | 3/2003 | Gao et al. |
| 2003/0205083 A1 | 11/2003 | Tubel et al. |
| 2003/0205375 A1 | 11/2003 | Wright et al. |
| 2004/0006429 A1 | 1/2004 | Brown |
| 2004/0033017 A1 | 2/2004 | Kringlebotn et al. |
| 2004/0093950 A1 | 5/2004 | Bohnert |
| 2004/0117119 A1 | 6/2004 | West et al. |
| 2004/0140091 A1 | 7/2004 | Gupta |
| 2006/0081412 A1 | 4/2006 | Wright et al. |
| 2006/0214098 A1 | 9/2006 | Ramos |
| 2006/0250274 A1 | 11/2006 | Mombourquette et al. |
| 2006/0272809 A1* | 12/2006 | Tubel et al. ............ 166/250.01 |
| 2007/0000912 A1 | 1/2007 | Aisenbrey |
| 2007/0228288 A1 | 10/2007 | Smith |
| 2008/0042636 A1 | 2/2008 | Koste et al. |
| 2008/0053702 A1 | 3/2008 | Smith, Jr. |
| 2008/0210426 A1 | 9/2008 | Lembcke et al. |
| 2008/0241964 A1 | 10/2008 | Kaieda et al. |
| 2009/0071080 A1 | 3/2009 | Bourgain et al. |
| 2009/0199630 A1 | 8/2009 | Difoggio et al. |
| 2009/0237084 A1 | 9/2009 | Itskovich et al. |
| 2009/0268197 A1 | 10/2009 | Perron et al. |
| 2009/0296755 A1 | 12/2009 | Brown et al. |
| 2010/0046002 A1 | 2/2010 | Perez et al. |
| 2010/0134113 A1 | 6/2010 | Depavia et al. |
| 2010/0237084 A1 | 9/2010 | Freed |
| 2010/0271030 A1 | 10/2010 | Reiderman et al. |
| 2011/0017512 A1 | 1/2011 | Codazzi |
| 2011/0074428 A1 | 3/2011 | Wang |
| 2011/0083838 A1 | 4/2011 | Labrecque |
| 2011/0084696 A1 | 4/2011 | Tenghamn et al. |
| 2011/0088462 A1 | 4/2011 | Samson et al. |
| 2011/0090496 A1 | 4/2011 | Samson et al. |
| 2011/0100632 A1 | 5/2011 | Dinariev et al. |
| 2011/0139447 A1 | 6/2011 | Ramos et al. |
| 2011/0163891 A1 | 7/2011 | Wilson et al. |
| 2011/0170112 A1 | 7/2011 | Leblanc |
| 2011/0198078 A1 | 8/2011 | Harrigan et al. |
| 2011/0277996 A1 | 11/2011 | Cullick et al. |
| 2011/0298461 A1 | 12/2011 | Bittar et al. |
| 2011/0308788 A1 | 12/2011 | Ravi et al. |
| 2012/0001625 A1 | 1/2012 | Yamada et al. |
| 2012/0013893 A1 | 1/2012 | Maida et al. |
| 2012/0014211 A1 | 1/2012 | Maida et al. |
| 2012/0061084 A1 | 3/2012 | Sweatman et al. |
| 2012/0126993 A1 | 5/2012 | Samson et al. |
| 2012/0147381 A1 | 6/2012 | Leblanc et al. |
| 2012/0147924 A1 | 6/2012 | Hall |
| 2012/0205103 A1 | 8/2012 | Ravi et al. |
| 2012/0223717 A1 | 9/2012 | LaBrecque |
| 2012/0234605 A1 | 9/2012 | Donderici et al. |
| 2012/0257475 A1 | 10/2012 | Luscombe et al. |
| 2012/0293179 A1 | 11/2012 | Colombo et al. |
| 2013/0018585 A1 | 1/2013 | Zhdanov et al. |
| 2013/0018588 A1 | 1/2013 | Zhdanov et al. |
| 2013/0032404 A1 | 2/2013 | Donderici et al. |
| 2013/0056197 A1 | 3/2013 | Maida et al. |
| 2013/0105224 A1 | 5/2013 | Donderici et al. |
| 2013/0141102 A1 | 6/2013 | Donderici et al. |
| 2013/0166215 A1 | 6/2013 | Bittar et al. |
| 2013/0169278 A1 | 7/2013 | Bittar et al. |
| 2013/0248250 A1 | 9/2013 | Bittar et al. |
| 2013/0249705 A1 | 9/2013 | Sharp et al. |
| 2013/0279841 A1 | 10/2013 | Joinson |
| 2014/0036628 A1 | 2/2014 | Hill et al. |
| 2014/0097848 A1 | 4/2014 | Leblanc et al. |
| 2014/0139225 A1 | 5/2014 | Mandviwala |
| 2014/0139226 A1 | 5/2014 | Jaaskelainen et al. |

FOREIGN PATENT DOCUMENTS

| | | |
|---|---|---|
| GB | 2433112 A | 6/2007 |
| GB | 2433112 B | 7/2008 |
| GB | 2452609 A | 3/2009 |
| JP | 2011069700 | 7/2011 |
| WO | WO-2008/124286 | 10/2008 |
| WO | WO-2012/005737 | 1/2012 |
| WO | WO-2012/061844 | 5/2012 |
| WO | WO-2012/075474 | 6/2012 |
| WO | WO-2012/100217 | 7/2012 |
| WO | WO-2012/144977 | 10/2012 |
| WO | WO-2013/066436 | 5/2013 |
| WO | WO-2014/109816 | 7/2014 |

OTHER PUBLICATIONS

Maida, John L., et al., "Downhole Species Selective Optical Fiber Sensor Systems and Methods", U.S. Appl. No. 13/253,788, filed Oct. 5, 2011, 23 pgs.

Maida, John L., et al., "Optical Casing Collar Locator Systems and Methods", U.S. Appl. No. 13/226,578, filed Sep. 7, 2011, 30 pgs.

Ravi, Kris et al., "Downhole Fluid Tracking with Distributed Acoustic Sensing", U.S. Appl. No. 13/726,054, filed Dec. 22, 2012, 24 pgs.

Samson, Etienne M., et al., "Downhole Systems and Methods for Water Source Determination", U.S. Appl. No. 13/418,455, filed Mar. 13, 2012, 27 pgs.

San Martin, Luis E., et al., "Fiberoptic Systems and Methods for Subsurface EM Field Monitoring", filed concurrently herewith, 19 pgs, Jan. 8, 2013.

Sharp, David P., et al., "Casing Collar Locator with Wireless Telemetry Support", U.S. Appl. No. 13/426,414, filed Mar. 21, 2012, 30 pgs.

(56) References Cited

OTHER PUBLICATIONS

Skinner, Neal G., et al., "Downhole Time Domain Reflectometry with Optical Components", U.S. Appl. No. 13/655,607, filed Oct. 19, 2012, 32 pgs.

Jaaskelainen, Mikko et al., "Optical Push-Pull Interferometric Sensors for Electromagnetic Sensing", U.S. Appl. No. 13/679,940, filed Nov. 16, 2012, 34 pgs.

Mandviwala, Tasneem A., "Well Monitoring with Optical Electromagnetic Sensors", U.S. Appl. No. 13/679,926, filed Nov. 16, 2012, 28 pgs.

Vohra, S. T. et al., "Fiber-optic ac electric-field sensor based on the electrostrictive effect", Optic Letters, vol. 17, No. 5, Mar. 1, 1992, 3 pgs.

"Crosswell electromagnetic tomography: System design considerations and field results", M. J. Wilt, D. L. Alumbaugh, H. F. Morrison, A. Becker, K. H. Lee, and M. Deszez-Pan, 1995, Geophysics, 60 (3), 871-885, 15 pgs.

"Reservoir monitoring in oil sands: Developing a permanent crosswell system", R. Tøndel, J. Ingham, D. LaBrecque, H. Schütt, D. McCormick, R. Godfrey, J. A. Rivero, S. Dingwall, and A. Williams, 2011, presented at SEG Annual Meeting, San Antonio, 5 pgs.

"Surface-downhole electrical resistivity tomography applied to monitoring of CO2 storage at Ketzin, Germany", P. Bergmann, C. Schmidt-Hattenberger, D. Kiessling, C. Rucker, T. Labitzke, J. Henninges, G. Baumann, and H. Schutt, 2012, Geophysics, vol. 77 (6), 15 pgs.

Bhatia, Vikram et al., "Optical Fiber Long-Period Grating Sensors", Optics Letter, vol. 21, No. 9, (May 1, 1996), 3 pgs.

Bristow, Q. et al., "A New Temperature, Capacitive-Resistivity, and Magnetic-Susceptibility Borehole Probe for Mineral Exploration, Groundwater, and Environmental Applications", Geological Survey of Canada, Technical Note No. 3, doi: 10.4095/289197, (2011), 13 pgs.

Donderici, Burkay, "Compensated Cross-Well Tomography Methods and Systems", PCT Appl No. PCT/US2011/055020, filed Oct. 6, 2011, 19 pgs.

Douma, Marten et al., "A Capacitive-Coupled Ground Resistivity System for Engineering and Environmental Applications: Results of Two Canadian Field Tests", SEG Annual Meeting, Expanded Abstracts, (1994), pp. 559-561.

Grard, R. et al., "A Mobile Four-Electrode Array and Its Application to the Electrical Survey of Planetary Grounds at Shallow Depths", Journal of Geophysical Research, vol. 96, No. B3, (Mar. 10, 1991), pp. 4117-4123.

Hibbs, A. D. et al., "Capacitive Electric Field Measurements for Geophysics", EAGE Conference and Exhibition incorporating SPE EUROPEC 2011, Vienna, Austria, Expanded Abstracts, (2011), 2 pgs.

Hibbs, Andrew et al., "New Electromagnetic Sensors for Magnetotelluric and Induced Polarization Geophysical Surveys", SEG Annual Meeting, Expanded Abstracts, (2012), 5 pgs.

Kiessling, Dana et al., "Geoelectrical Methods for Monitoring Geological CO2 Storage: First Results From Cross-Hole and Surface-Downhole Measurements From the CO2Sink Test Site at Ketzin (Germany)", International Journal of Greenhouse Gas Control, 4, (2010), pp. 816-826.

Kuras, Oliver et al., "Fundamentals of the Capacitive Resistivity Technique", Geophysics, vol. 71, No. 3 (May-Jun. 2006), pp. G135-G152.

LaBrecque, Douglas et al., "Assessment of Measurement Errors for Galvanic-Resistivity Electrodes of Different Composition", Geophysics, vol. 73, No. 2 (Mar.-Apr. 2008), pp. F55-F64.

Leblanc, Michel J., et al., "Fiberoptic Systems an Methods Detecting EM Signals Via Resistive Heating", U.S. Appl. No. 13/648,897, filed Oct. 10, 2012, 18 pgs.

MacNae, James et al., "Near-Surface Resistivity Contast Mapping With a Capacitive Sensor Array and an Inductive Source", Geophysics, vol. 76, No. 2, (Mar.-Apr. 2011), pp. G13-G23.

Mwenifumbo, C. J. et al., "Field Evaluation of a New Borehole Resistivity Probe Using Capacitive Electrodes", Proceedings of the Symposium on the Applications of Geophysics to Engineering and Environmental Problems, (1999), pp. 859-867.

Mwenifumbo, C. Jonathan et al., "Capacitive Conductivity Logging and Electrical Stratigraphy in a High-Resistivity Aquifer, Boise Hydrogeophysical Research Site", Geophysics, vol. 74, No. 3 (May-Jun. 2009), pp. E125-E133.

Panissod, Cedric et al., "Recent Developments in Shallow-Depth Electrical and Electrostatic Prospecting Using Mobile Arrays", Geophysics, vol. 63, No. 5 (Sep.-Oct. 1998), pp. 1542-1550.

Shima, Hiromasa et al., "Developments of Non-Contact Data Acquisition Techniques in Electrical and Electromagnetic Explorations", Journal of Applied Geophysics, 35, (1996), pp. 167-173.

Tabbagh, Alain et al., "Determination of Electrical Properties of the Ground at Shallow Depth With an Electrostatic Quadrupole: Field Trials on Archaeological Sites", Geophysical Prospecting, 41, (1993), pp. 579-597.

Thiel, David V. "On Measuring Electromagnetic Surface Impedance—Discussions with Professor James R. Wait", IEEE Transactions on Antennas and Propogation, vol. 48, No. 10, (2000), pp. 1517-1520.

Timofeeev, V.M. et al., "A New Ground Resistivity Method for Engineering and Environmental Geophysics", Proceedings of the Symposium on the Applications of Geophysics to Engineering and Environmental Problems, (1994), pp. 701-715.

Wu, Hsu-Hsiang et al., "Deep Formation Evaluation Systems and Methods", PCT Appl No. PCT/US2012/071550 filed Dec. 23, 2012, 23 pgs.

Zonge, Kenneth L. et al., "The Effect of Electrode Contact Resistance on Electric Field Measurements", 55th SEG Annual Meeting, Washington D.C., Expanded Abstracts, (1985), 8 pgs.

"PCT International Search Report and Written Opinion", dated Nov. 5, 2014, Appl No. PCT/US2014/019228, filed Feb. 28, 2014, 14 pgs.

"PCT Written Opinion", dated Jan. 10, 2014, Appl No. PCT/US2013/064115, filed Oct. 9, 2013, 10 pgs.

"UK Examination Report", dated Feb. 5, 2014, Appl No. 1315987.6, filed Sep. 9, 2013, 6 pgs.

"PCT Written Opinion", dated Feb. 17, 2014, Appl No. PCT/US2013/067285, filed Nov. 29, 2013, 14 pgs.

"US Non-Final Office Action", dated Aug. 14, 2014, U.S. Appl. No. 13/648,897, filed Oct. 10, 2012, 22 pgs.

"US Final Office Action", dated Dec. 31, 2014, U.S. Appl. No. 13/648,897, filed Oct. 10, 2012, 26 pgs.

"PCT International Search Report and Written Opinion", dated Feb. 4, 2015, U.S. Appl No. PCT/US2014/038542, "A Magnetic Induction Sensor with an Electro-Optical Transducer and Related Methods and Systems," filed May 19, 2014, 17 pgs.

"PCT International Search Report and Written Opinion", dated Feb. 17, 2015, U.S. Appl No. PCT/US2014/038552, "Optical Magnetic Field Sensor Units for a Downhole Environment, " filed May 19, 2015, 15 pgs.

\* cited by examiner

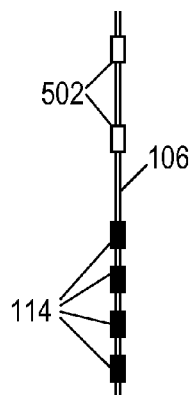
FIG. 5A
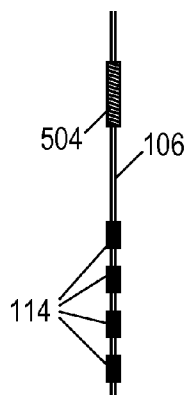
FIG. 5B
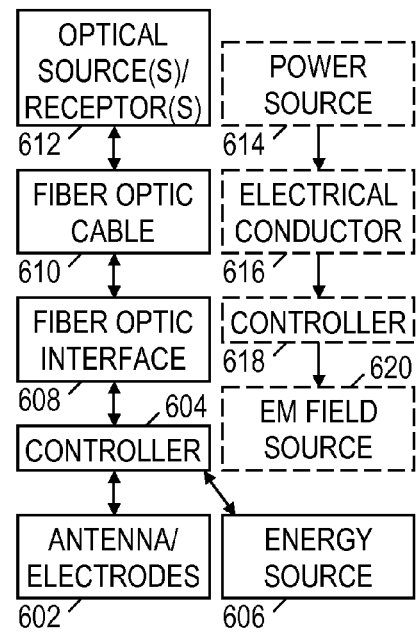
FIG. 6
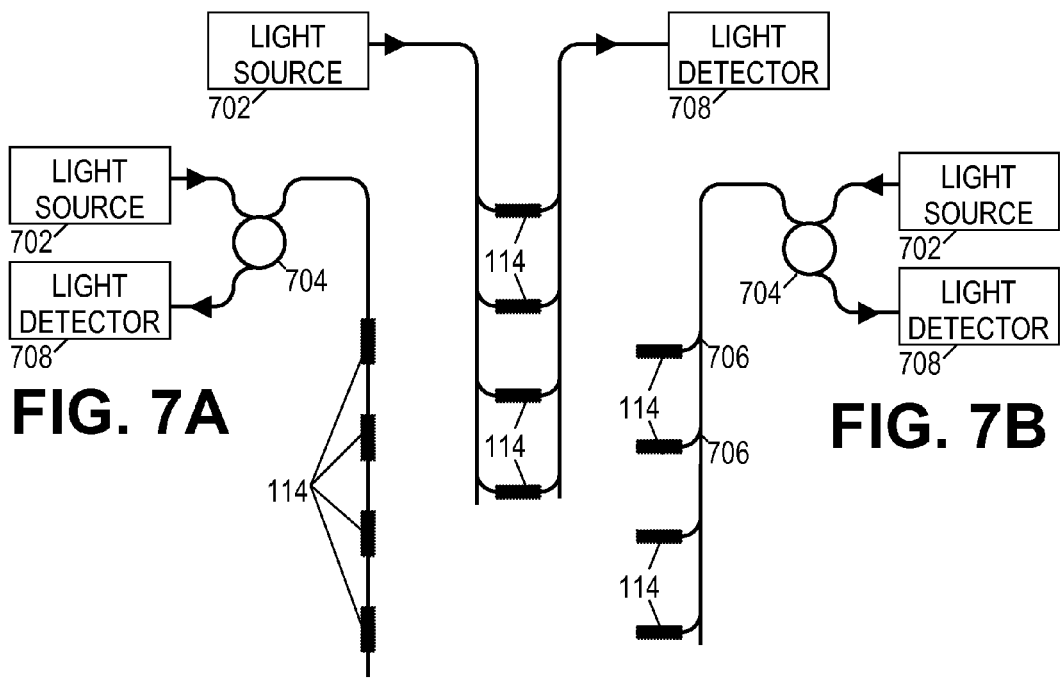
FIG. 7C
FIG. 7A
FIG. 7B

FIBEROPTIC SYSTEMS AND METHODS FOR FORMATION MONITORING

BACKGROUND

Oil field operators drill boreholes into subsurface reservoirs to recover oil and other hydrocarbons. If the reservoir has been partially drained or if the oil is particularly viscous, the oil field operators will often inject water or other fluids into the reservoir via secondary wells to encourage the oil to move to the primary ("production") wells and thence to the surface.

This flooding process can be tailored with varying fluid mixtures, flow rates/pressures, and injection sites, but may nevertheless be difficult to control due to inhomogeneity in the structure of the subsurface formations. The interface between the reservoir fluid and the injected fluid, often termed the "flood front", develops protrusions and irregularities that may reach the production well before the bulk of the residual oil has been flushed from the reservoir. This "breakthrough" of the flood fluid is undesirable, as it typically necessitates increased fluid handling due to the injected fluid's dilution of the oil and may further reduce the drive pressure on the oil. Continued operation of the well often becomes commercially infeasible.

BRIEF DESCRIPTION OF THE DRAWINGS

Accordingly, there are disclosed herein various fiberoptic systems and methods for formation monitoring. In the drawings:

FIGS. 5A-5B show illustrative combined source-sensor cable configurations.

FIG. 6 is a function block diagram of an illustrative formation monitoring system.

FIGS. 7A-7C show illustrative multiplexing architectures for distributed electromagnetic ("EM") field sensing.

Figure 1:
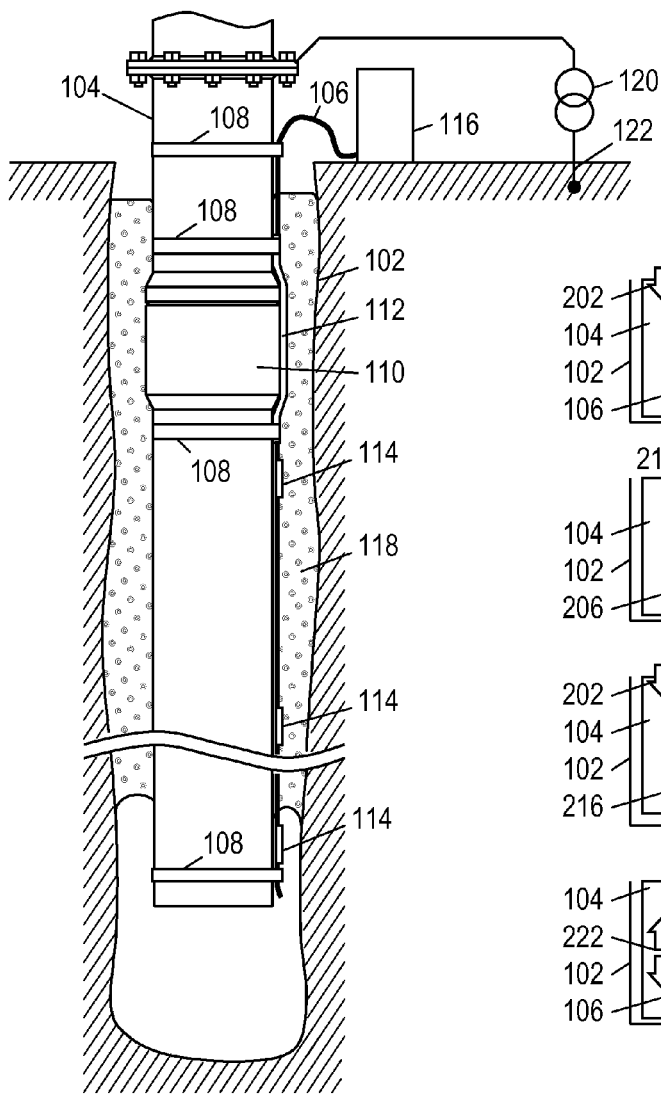
FIG. 1 shows an illustrative environment for permanent monitoring.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents a fiberoptic-based technology suitable for use in permanent downhole monitoring environment to track an approaching fluid front and enable actions to optimize hydrocarbon recovery from a reservoir. One illustrative formation monitoring system has an array of electromagnetic field sensors positioned in an annular space around a well casing, the sensors being coupled to a surface interface via a fiberoptic cable. Each electromagnetic field sensor is a device that produces signals that are a function of external electric or magnetic fields. Illustrative sensors provide signals that are directly or inversely proportional to electric or magnetic field strength, the temporal or spatial derivative of the electric or magnetic fields, or the temporal or spatial integral of the fields. Other illustrative sensors have reception characteristics that measure both electric and magnetic fields. The sensor measurements in response to an injected current or another electromagnetic field source can be used to determine a resistivity distribution around the well, which in turn enables tracking of the flood front. (Although the term "flood front" is generally used herein to refer to the interface between reservoir fluid and injected fluid zones, the teachings of the present disclosure will apply to the interface between any two fluids having different bulk resistivities.)

Turning now to the drawings, FIG. 1 shows an illustrative permanent downhole monitoring environment. A borehole 102 contains a casing string 104 with a fiber optic cable 106 secured to it by bands 108. Casing 104 is a tubular pipe, usually made of steel, that preserves the integrity of the borehole wall and borehole. Where the cable 106 passes over a casing joint 110, it may be protected from damage by a cable protector 112. Electromagnetic (EM) field sensors 114 are integrated into the cable 106 to obtain EM field measurements and communicate those measurements to a surface interface 116 via fiberoptic cable 106.

The remaining annular space may be filled with cement 118 to secure the casing 104 in place and prevent fluid flows in the annular space. Fluid enters the uncemented portion of the well (or alternatively, fluid may enter through perforated portions of the well casing) and reaches the surface through the interior of the casing. Note that this well configuration is merely illustrative and not limiting on the scope of the disclosure. Many production wells are provided with multiple production zones that can be individually controlled. Similarly, many injection wells are provided with multiple injection zones that can be individually controlled.

Surface interface 116 includes an optical port for coupling the optical fiber(s) in cable 106 to a light source and a detector. The light source transmits pulses of light along the fiber optic cable, including any sensors 114. The sensors 114 modify the light pulses to provide measurements of field strength, field gradient, or time derivative for electrical fields and/or magnetic fields. The modifications may affect amplitude, phase, or frequency content of the light pulses, enabling the detector to responsively produce an electrical output signal indicative of the sensor measurements. Some systems may employ multiple fibers, in which case an additional light source and detector can be employed for each fiber, or the existing source and detector may be switched periodically between the fibers. Some system embodiments may alternatively employ continuous wave (CW) light rather than light pulses.

FIG. 1 further shows a power source 120 coupled between the casing 104 and a remote earth electrode 122. Because the casing 104 is an electrically conductive material (e.g., steel), it acts as a source electrode for current flow into the formations surrounding the borehole 102. The magnitude and distribution of the current flow will vary in accordance with the source voltage and the formation's resistivity profile. The EM field measurements by sensors 114 will thus be representative of the resistivity profile. This resistivity profile in turn is indicative of the fluids in the formation pores, enabling the flood front to be located and tracked over time.

The surface interface 116 may be coupled to a computer that acts as a data acquisition system and possibly as a data processing system that analyzes the measurements to derive subsurface parameters and track the location of a fluid front. In some contemplated system embodiments, the computer may further control production parameters to reduce risk of breakthrough or to otherwise optimize production based on the information derived from the measurements. Production parameters may include the flow rate/pressure permitted from selected production zones, flow rate/pressure in selected injection zones, and the composition of the injection fluid, each of which can be controlled via computer controlled valves and pumps.

Generally, any such computer would be equipped with a user interface that enables a user to interact with the software via input devices such as keyboards, pointer devices, and touchscreens, and via output devices such as printers, monitors, and touchscreens. The software can reside in computer memory and on nontransient information storage media. The computer may be implemented in different forms including, e.g., an embedded computer permanently installed as part of the surface interface 116, a portable computer that is plugged into the surface interface 116 as desired to collect data, a remote desktop computer coupled to the surface interface 116 via a wireless link and/or a wired computer network, a mobile phone/PDA, or indeed any electronic device having a programmable processor and an interface for I/O.

Figure 2A:
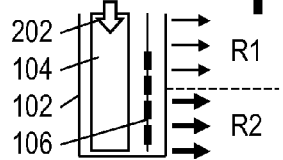
FIGS. 2A-2E show various illustrative injected-current system configurations.

FIG. 2A is a schematic representation of the system configuration in FIG. 1. It shows a borehole 102 having a casing 104 and a fiberoptic cable 106 (with an integrated sensor array) in the annular space. An injected current 202 flows along casing 104 and disperses into the surrounding formations as indicated by the arrows. Two formations are shown, labeled with their respective resistivities R1 and R2. The heavier arrows in the lower formation represent a larger current flow, indicating that resistivity R2 is lower than resistivity R1. Due to divergence pattern of the currents away from the casing, depth of investigation is typically around 5-15 feet.

Figure 2B:
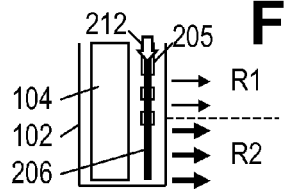

FIG. 2B shows an alternative system configuration, in which the fiberoptic cable 106 is replaced by an alternative fiberoptic cable 206 having a conductor or a conductive layer to transport an injected current 212 along the cable. The conductor may be a protective metal tube within which the fiberoptic cable is placed. Alternatively, the conductor may be a wire (e.g., a strength member) embedded in the fiberoptic cable. As another alternative, a metal coating may be manufactured on the cable to serve as the current carrier. Parts of the cable may be covered with an insulator 205 to focus the current dispersal in areas of interest. The optical fiber in cable 212 may act as a distributed sensor or, as in previous embodiments, localized sensors may be integrated into the cable. Because conductive layers can significantly attenuate certain types of electromagnetic fields, the sensors are designed to be operable despite the presence of the conductive layer, e.g., magnetic field sensors, and/or apertures are formed in the conductive layer to permit the EM fields to reach the sensors.

Figure 2C:
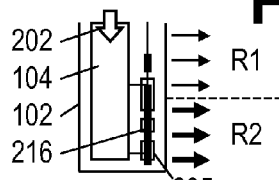

FIG. 2C shows another alternative system configuration. A conductor or conductive layer of fiberoptic cable 206 is electrically coupled to casing 104 to share the same electrical potential and contribute to the dispersal of current into the formation. Parts of the cable 206 and/or casing 104 may be covered with an insulator 205 to focus the current dispersal in areas of interest.

Figure 2D:
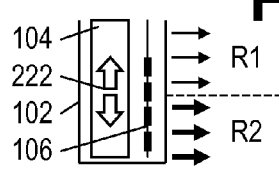

FIG. 2D shows yet another alternative system configuration. Rather than providing an injected current 202 from the surface as in FIG. 2A, the configuration of FIG. 2D provides an injected current 222 from an intermediate point along the casing 104. Such a current may be generated with an insulated electrical cable passing through the interior of casing 104 from a power source 120 (FIG. 1) to a tool that makes electrical contact at the intermediate point, e.g., via extendible arms. (An alternative approach employs a toroid around casing 104 at the intermediate point to induce current flow along the casing. The toroid provides an electric dipole radiation pattern rather than the illustrated monopole radiation pattern.)

Figure 2E:
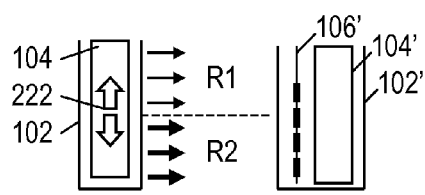

FIG. 2E shows still another alternative system configuration having a first borehole 102 and second borehole 102'. Casing 104 in the first borehole 102 carries an injected current from the surface or an intermediate point and disperses it into the surrounding formations. The second borehole 102' has a casing 104' for producing hydrocarbons and further includes a fiberoptic cable 106' with an integrated EM sensor array in the annular space around casing 104'. The EM sensors provide measurements of the fields resulting from the currents dispersed in the formations.

Figure 3A:
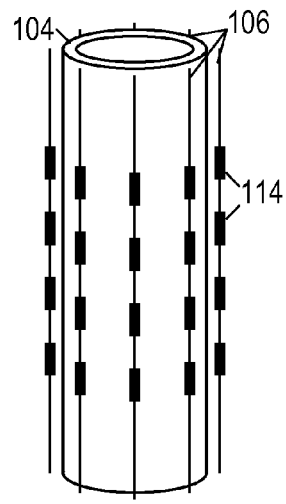
FIGS. 3A-3E show various illustrative sensing array configurations.
Figure 3B:
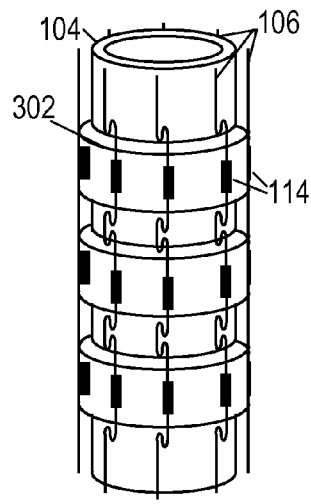
Figure 3C:
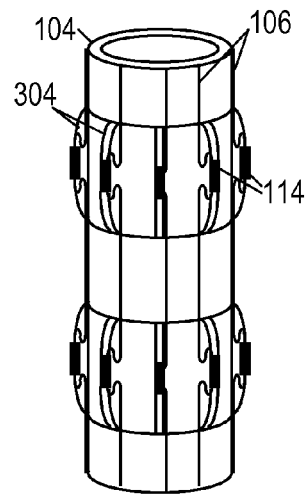

The sensor array may employ multiple fiberoptic cables 106 as indicated in FIG. 3A. With cables 106 positioned in parallel or at least in an overlapping axial range, the azimuthal arrangement of sensors 114 enables a multi-dimensional mapping of the electromagnetic fields. In some embodiments, the sensors are mounted to the casing 104 or suspended on fins or spacers to space them away from the body of casing 104. If actual contact with the formation is desired, the sensors 114 may be mounted on swellable packers 302 as indicated in FIG. 3B. Such packers 302 expand when exposed to downhole conditions, pressing the sensors 114 into contact with the borehole wall. FIG. 3C shows the use of bow-spring centralizers 304 which also operate to press the sensors 114 into contact with the borehole walls. To minimize insertion difficulties, a restraining mechanism may hold the spring arms 304 against the casing 104 until the casing has been inserted in the borehole. Thereafter, exposure to downhole conditions or a circulated fluid (e.g., an acid) degrades the restraining mechanism and enables the spring arms to extend the sensors against the borehole wall. If made of conductive material, the spring arms may further serve as current injection electrodes, concentrating the measurable fields in the vicinity of the sensors. To further concentrate the fields, the spring arms outside the zone of interest may be insulated.

Figure 3D:
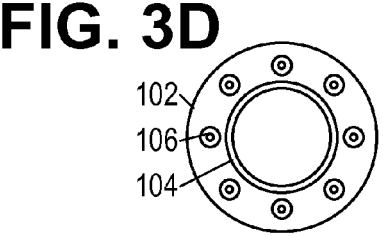
Figure 3E:
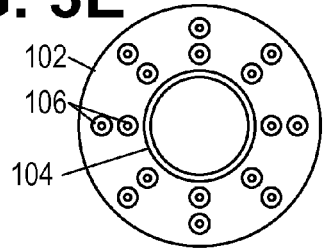

Other extension mechanisms are known in the oilfield and may be suitable for placing the sensors 114 in contact with the borehole wall or into some other desired arrangements such as those illustrated in FIGS. 3D and 3E. In FIG. 3D, the sensors are positioned near the radial midpoint of the annular region. In FIG. 3E, the sensors are placed in a spatial distribution having axial, azimuthal, and radial variation. Balloons, hydraulic arms, and projectiles are other contemplated mechanisms for positioning the sensors.

Figure 4:
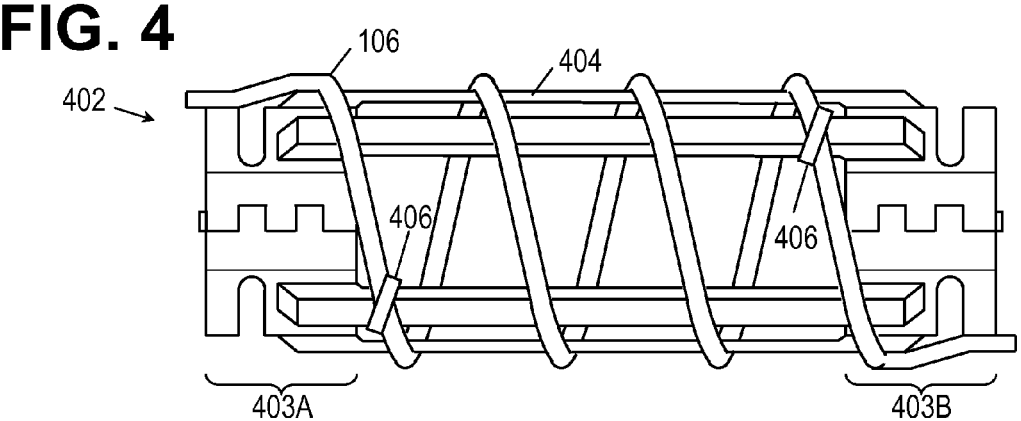
FIG. 4 shows yet another illustrative sensing array configuration.

FIG. 4 shows an illustrative fixed positioning mechanism for sensors 114. The cage 402 includes two clamps 403A, 403B joined by six ribs 404. The fiberoptic cable(s) 106 can be run along the ribs or, as shown in FIG. 4, they can be wound helically around the cage. In either case, the ribs provide each fiberoptic cable 106 some radial spacing from the casing 104. Cable ties 406 can be used to hold the cable in place until cementing has been completed. The ribs can be made of insulating material to avoid distortion of the electromagnetic fields around the sensors.

In addition to providing support and communications for sensors 114, the fiberoptic cable 106 may support electrodes or antennas for generating electromagnetic fields in the absence of current injection via casing 104. FIG. 5A shows two electrodes 502 on cable 106. A voltage is generated between the two electrodes 502 to create an electric dipole radiation pattern. The response of the electromagnetic sensors 114 can then be used to derive formation parameters.

Similarly, FIG. 5B shows a solenoid antenna 504 on cable 106. A current is supplied to the solenoid coil to create a magnetic dipole radiation pattern. The response of the electromagnetic sensors 114 can then be used to derive formation parameters. In both cases the sensors are shown to one side of the source, but this is not a requirement. The source may be positioned between sensors 114 and/or one or more of the sensors may be positioned between multiple sources. The sensors 114 may even be positioned between the electrodes of a electric dipole source. Moreover, it is possible to tilt the sources and/or the sensors to provide improved directional sensitivity.

FIG. 6 provides a function block representation of an illustrative fiberoptic-based permanent monitoring system. The sensors 114 include electrodes, antennas, or other transducers 602 that convert a property of the surrounding electromagnetic field into a signal that can be sensed via an optical fiber. (Specific examples are provided further below.) An energy source 606 may be provided in the form of a pair of conductors conveying power from the surface or in the form of a powerful downhole battery that contains enough energy to make the device operate for the full life span. It is possible to use an energy saving scheme to turn on or off the device periodically. It is also possible to adjust the power level based on inputs from the fiber optic cable, or based on the sensor inputs.

A controller 604 provides power to the transducers 602 and controls the data acquisition and communication operations and may contain a microprocessor and a random access memory. Transmission and reception can be time activated, or may be based on a signal provided through the optic cable or casing. A single sensor module may contain multiple antennas/electrodes that can be activated sequentially or in parallel. After the controller 604 obtains the signal data, it communicates the signal to the fiberoptic interface 608. The interface 608 is an element that produces new optical signals in fiberoptic cable 610 or modifies existing optical signals in the cable 610. For example, optical signal generation can be achieved by the use of LEDs or any other type of optical source. As another example, optical signals that are generated at the surface can be modified by thermal or strain effects on the optical fiber in cable 610. Thermal effects can be produced by a heat source or sink, whereas strain effects can be achieved by a piezoelectric device or a downhole electrical motor.

Modification can occur via extrinsic effects (i.e., outside the fiber) or intrinsic effects (i.e., inside the fiber). An example of the former technique is a Fabry Pérot sensor, while an example of the latter technique is a Fiber Bragg Grating. For optimum communication performance, the signal in the optical transmission phase may be modulated, converted to digital form, or digitally encoded. The cable is coupled to a receiver or transceiver 612 that converts the received light signals into digital data. Stacking of sequential measurements may be used to improve signal to noise ratio. The system can be based on either narrowband (frequency type) sensing or ultra wideband (transient pulse) sensing. Narrowband sensing often enables the use of reduced-complexity receivers, whereas wideband sensing may provide more information due to the presence of a wider frequency band.

Optionally, a power source 614 transmits power via an electrical conductor 616 to a downhole source controller 618. The source controller 618 operates an EM field source 620 such as an electric or magnetic dipole. Multiple such sources may be provided and operated in sequence or in parallel at such times and frequencies as may be determined by controller 618.

Multiple sensors 114 may be positioned along a given optical fiber. Time and/or frequency multiplexing is used to separate the measurements associated with each sensor. In FIG. 7A, a light source 702 emits light in a continuous beam. A circulator 704 directs the light along fiberoptic cable 106. The light travels along the cable 106, interacting with a series of sensors 114, before reflecting off the end of the cable and returning to circulator 704 via sensors 114. The circulator directs the reflected light to a light detector 708. The light detector 708 includes electronics that separate the measurements associated with different sensors 114 via frequency multiplexing. That is, each sensor 114 affects only a narrow frequency band of the light beam, and each sensor is designed to affect a different frequency band.

In FIG. 7B, light source 702 emits light in short pulses. Each sensor 114 is coupled to the main optical fiber via a splitter 706. The splitters direct a small fraction of the light from the optical fiber to the sensor, e.g., 1% to 4%. The sensor 114 interacts with the light and reflects it back to the detector 708 via the splitter, the main fiber, and the circulator. Due to the different travel distances, each pulse of light from source 702 results in a sequence of return pulses, with the first pulse arriving from the nearest sensor 114, the second pulse arriving from the second nearest sensor, etc. This arrangement enables the detector to separate the sensor measurements on a time multiplexed basis.

The arrangements of FIGS. 7A and 7B are both reflective arrangements in which the light reflects from a fiber termination point. They can each be converted to a transmissive arrangement in which the termination point is replaced by a return fiber that communicates the light back to the surface. FIG. 7C shows an example of such an arrangement for the configuration of FIG. 7B. A return fiber is coupled to each of the sensors via a splitter to collect the light from the sensors 114 and direct it to a light detector 708.

Other arrangement variations also exist. For example, multiple sensors may be coupled in series on each branch of the FIG. 7B, 7C arrangements. A combination of time division, wavelength-division and/or frequency division multiplexing could be used to separate the individual sensor measurements.

Thus each production well may be equipped with a permanent array of sensors distributed along axial, azimuthal and radial directions outside the casing. The sensors may be positioned inside the cement or at the boundary between cement and the formation. Each sensor is either on or in the vicinity of a fiber optic cable that serves as the communication link with the surface. Sensor transducers can directly interact with the fiber optic cables or, in some contemplated embodiments, may produce electrical signals that in turn induce thermal, mechanical (strain), acoustic or electromagnetic effects on the fiber. Each fiber optic cable may be associated with multiple EM sensors, while each sensor may produce a signal in multiple fiber optic or fiber optic cables. Even though the figures show uniformly-spaced arrays, the sensor positioning can be optimized based on geology or made randomly. In any configuration, the sensor positions can often be precisely located by monitoring the light signal travel times in the fiber.

Cement composition may be designed to enhance the sensing capability of the system. For example, configurations employing the casing as a current source electrode can employ a cement having a resistivity equal to or smaller than the formation resistivity.

The sensors 114 referenced above preferably employ fully optical means to measure EM fields and EM field gradients and transfer the measurement information through optical fibers to the surface for processing to extract the measurement information. The sensors will preferably operate passively, though in many cases sensors with minimal power requirements can be powered from small batteries. The minimization of electronics or downhole power sources provides a big reliability advantage. Because multiple sensors can share a single fiber, the use of multiple wires with associated connectors and/or multiplexers can also be avoided, further enhancing reliability while also reducing costs.

Figure 8A:
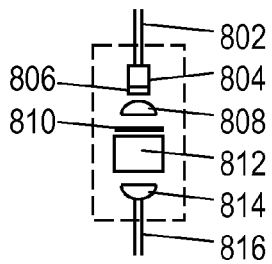
FIGS. 8A-8C show various illustrative EM field sensor configurations.
Figure 8B:
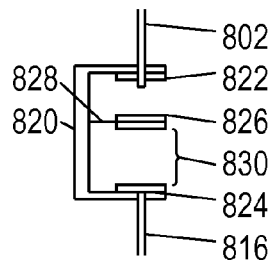
Figure 8C:
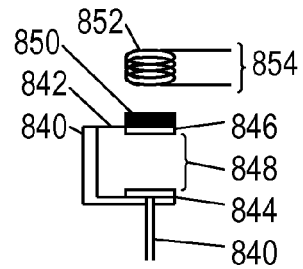

Several illustrative fiberoptic sensor configurations are shown in FIGS. 8A-8C. FIG. 8A shows an atomic magnetometer configuration in which light from an input fiber 802 passes through a depolarizer 804 (to remove any polarization biases imposed by the fiber) and a polarizing filter 806 to produce polarized light. A gradient index (GRIN) lens 808 collimates the polarized light before it passes through an alkali vapor cell 812. A quarter-wave plate 810 enhances optical coupling into the cell. A second GRIN lens 814 directs light exiting the cell into an output fiber 816. The light passing through the cell consists of a pump pulse to polarize the alkali atoms, followed by a probe pulse to measure the spin relaxation rate. The attenuation of the probe pulse is directly related to the magnetic field strength.

FIG. 8B shows a sensor having a support structure 820 separating two electrodes 822, 824. A center electrode 826 is supported on a flexible arm 828. The center electrode 826 is provided with a set charge that experiences a force in the presence of an electrical field between electrodes 822, 824. The force causes displacement of the center electrode 826 until a restoring force of the compliant arm 828 balances the force from the electrical field. Electrodes 824 and 826 are at least partially transparent, creating a resonant cavity 830 in the space between. The wavelengths of light that are transmitted and suppressed by the cavity 830 will vary based on displacement of center electrode 826. Thus the resonant cavity shapes the spectrum of light from input electrode 802, which effect can be seen in the light exiting from output fiber 816. The electrodes 822, 824 may be electrically coupled to a pair of spaced-apart electrodes (for electric field sensing) or to the terminals of a magnetic dipole antenna (for magnetic field sensing).

FIG. 8C shows a sensor having a support structure 840 with a flexible arm 842 that supports a mirror 846 above a window 844 to define a cavity 848. The arm further includes a magnet 850 or other magnetically responsive material that experiences a displacing force in response to a magnetic field from a coil 852. The coil's terminals 854 are coupled to spaced-apart electrodes (for electric field sensing) or another coil (for magnetic field sensing). Light entering the cavity 848 from fiber 840 reflects from mirror 846 and returns along fiber 840 to the surface. Displacement of the arm 842 alters the travel time and phase of the light passing along fiber 840.

The foregoing sensors are merely illustrative examples and not limiting on the sensors that can be employed in the disclosed systems and methods. An interrogation light pulse is sent from the surface through the fiber and, when the pulse reaches a sensor, it passes through the sensor and the light is modified by the sensor in accordance with the measured electromagnetic field characteristic. The measurement information is encoded in the output light and travels through the fiber to a processing unit located at the surface. In the processing unit the measurement information is extracted.

Figure 9:
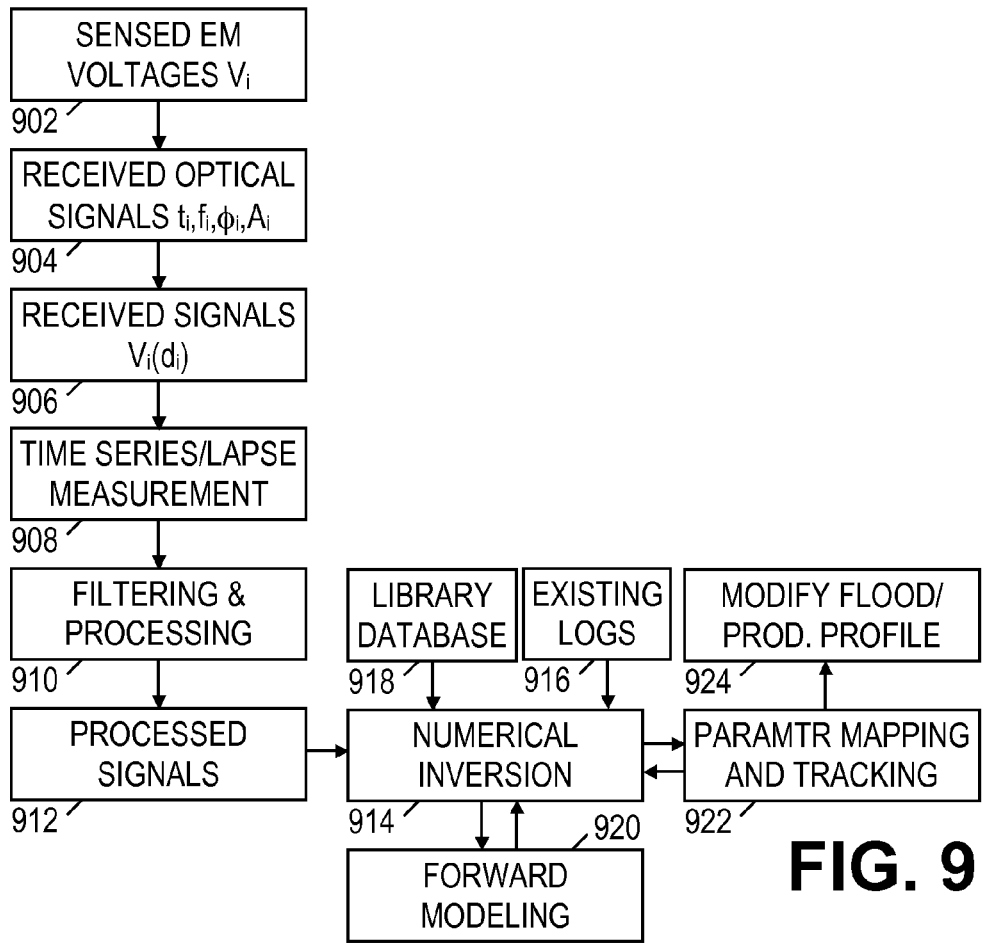
FIG. 9 is a signal flow diagram for an illustrative formation monitoring method.

FIG. 9 provides an overview of illustrative formation monitoring methods. A controlled electromagnetic field source generates a subsurface electromagnetic field. While it is possible for this field to be a fixed (DC) field, it is expected that better measurements will be achievable with an alternating current (AC) field having a frequency in the range of 1-1000 Hz. (In applications where shallow detection is desired, higher frequencies such as 1 kHz to 1 GHz can be used.) In block 902, each of the sensors convert the selected characteristic of the electromagnetic field into a sensed voltage $V_i$, where i is the sensor number. For energy efficiency, sensors can be activated and measurements can be taken periodically. This enables long-term monitoring applications (such as water-flood movements), as well as applications where only small number of measurements are required (fracturing). For further efficiency, different sets of sensors may be activated in different periods.

In block 904, the voltage (or electric field or magnetic field or electric/magnetic field gradient) is applied to modify some characteristic of light passing through an optical fiber, e.g., travel time, frequency, phase, amplitude. In block 906, the surface receiver extracts the represented voltage measurements and associates them with a sensor position $d_i$. The measurements are repeated and collected as a function of time in block 908. In addition, measurements at different times can be subtracted from each other to obtain time-lapse measurements. Multiple time-lapse measurements with different lapse durations can be made to achieve different time resolutions for time-lapse measurements. In block 910, a data processing system filters and processes the measurements to calibrate them and improve signal to noise ratio. Suitable operations include filtering in time to reduce noise; averaging multiple sensor data to reduce noise; taking the difference or the ratio of multiple voltages to remove unwanted effects such as a common voltage drift due to temperature; other temperature correction schemes such as a temperature correction table; calibration to known/expected resistivity values from an existing well log; and array processing (software focusing) of the data to achieve different depth of detection or vertical resolution.

In block 912, the processed signals are stored for use as inputs to a numerical inversion process in block 914. Other inputs to the inversion process are existing logs (block 916) such as formation resistivity logs, porosity logs, etc., and a library of calculated signals 918 or a forward model 920 of the system that generates predicted signals in response to model parameters, e.g., a two- or three-dimensional distribution of resistivity. All resistivity, electric permittivity (dielectric constant) or magnetic permeability properties of the formation can be measured and modeled as a function of time and frequency. The parameterized model can involve isotropic or anisotropic electrical (resistivity, dielectric, permeability) properties. They can also include layered formation models where each layer is homogeneous in resistivity. Resistivity variations in one or more dimensions can be included. More complex models can be employed so long as sufficient numbers of sensor types, positions, orientations, and frequencies are employed. The inversion process searches a model parameter space to find the best match between measured signals 912 and generated signals. In block 922 the parameters are stored and used as a starting point for iterations at subsequent times.

Effects due to presence of tubing, casing, mud and cement can be corrected by using a-priori information on these parameters, or by solving for some or all of them during the inversion process. Since all of these effects are mainly additive and they remain the same in time, a time-lapse measurement can remove them. Multiplicative (scaling) portion of the effects can be removed in the process of calibration to an existing log. All additive, multiplicative and any other non-linear effect can be solved for by including them in the inversion process as a parameter.

The fluid front position can be derived from the parameters and it is used as the basis for modifying the flood and/or production profile in block 924. Production from a well is a dynamic process and each production zone's characteristics may change over time. For example, in the case of water flood injection from a second well, water front may reach some of the perforations and replace the existing oil production. Since flow of water in formations is not very predictable, stopping the flow before such a breakthrough event requires frequent monitoring of the formations.

Profile parameters such as flow rate/pressure in selected production zones, flow rate/pressure in selected injection zones, and the composition of the injection fluid, can each be varied. For example, injection from a secondary well can be stopped or slowed down when an approaching water flood is detected near the production well. In the production well, production from a set of perforations that produce water or that are predicted to produce water in relatively short time can be stopped or slowed down.

We note here that the time lapse signal derived from the receiver signals is expected to be proportional to the contrast between formation parameters. Hence, it is possible to enhance the signal created by an approaching flood front by enhancing the electromagnetic contrast of the flood fluid relative to the connate fluid. For example, a high magnetic permeability, or electrical permittivity or conductivity fluid can be used in the injection process in the place of or in conjunction with water. It is also possible to achieve a similar effect by injecting a contrast fluid from the wellbore in which monitoring is taking place, but this time changing the initial condition of the formation.

The disclosed systems and methods may offer a number of advantages. They may enable continuous time-lapse monitoring of formations including a water flood volume. They may further enable optimization of hydrocarbon production by enabling the operator to track flows associated with each perforation and selectively block water influxes. Precise localization of the sensors is not required during placement since that information can be derived afterwards via the fiber optic cable. Casing source embodiments do not require separate downhole EM sources, significantly decreasing the system cost and increasing reliability.

Numerous other variations and modifications will become apparent to those skilled in the art once the above disclosure is fully appreciated. For example, this sensing system can be used for cross well tomography with EM transmitters are placed in one well and EM fields being measured in surrounding wells which can be drilled at an optimized distance with respect to each other and cover the volume of the reservoir from multiple sides for optimal imaging. It is intended that the following claims be interpreted to embrace all such variations and modifications where applicable.

What is claimed is:

1. A formation monitoring system that comprises:
   a casing that defines an annular space within a borehole;
   an array of electromagnetic field sensors in the annular space;
   an optical waveguide that conveys optical signals to and from the array of electromagnetic field sensors;
   a power source to generate a distribution of current flow into formations penetrated by said borehole;
   a surface interface coupled to the optical waveguide to receive optical signals from the array of electromagnetic field sensors, said received optical signals representing electromagnetic field measurements collected by the array of electromagnetic field sensors in response to the current flow; and
   a computer that operates on electromagnetic field measurement data corresponding to the received optical signals to calculate at least one parameter associated with an approaching flood front.

2. The system of claim 1, wherein the at least one parameter comprises a flood front location.

3. The system of claim 1, wherein the computer calculates the at least one parameter at different times.

4. The system of claim 3, further comprising a valve that controls a flow rate from at least one production zone in said borehole, wherein the computer provides a new setting for said valve based at least in part on said at least one parameter.

5. The system of claim 3, further comprising a pump that controls a flow rate to at least one zone in an injection well, wherein the computer provides a new pump rate for said pump based at least in part on said at least one parameter.

6. The system of claim 3, further comprising a valve that controls a flow rate to at least one injection zone, wherein the computer provides a new setting for said valve based at least in part on said at least one parameter.

7. The system of claim 1, wherein the power source is coupled to the casing to generate the distribution of current flow into formations penetrated by said borehole.

8. The system of claim 7, wherein the power source is electrically connected to said casing above ground.

9. The system of claim 7, wherein the power source is electrically connected to a tool suspended on a cable, control line, tubing, or coiled tubing inside the casing.

10. The system of claim 7, wherein the power source is electrically connected to a casing in a second borehole.

11. The system of claim 7, wherein the power source is electrically connected to a tool suspended on a cable, control line, tubing, or coiled tubing in a second borehole for cross-well monitoring.

12. The system of claim 7, wherein at least one of said electromagnetic field sensors measures a radial electric field component.

13. The system of claim 1, wherein the optical waveguide comprises a fiberoptic cable.

14. The system of claim 13, wherein the fiberoptic cable includes one or more electrical conductors coupled to the power source to generate the distribution of current into formations penetrated by said borehole.

15. The system of claim 13, wherein the fiberoptic cable includes one or more electrical conductors that are uninsulated near regions of interest and insulated in other regions to direct current from the power source to said regions of interest.

16. The system of claim 13, further comprising a second fiberoptic cable coupled to electromagnetic field sensors in the annular space that are in an axial range overlapping with an axial range of the array of electromagnetic sensors coupled to the optical waveguide.

17. The system of claim 1, further comprising at least one electric dipole source antenna positioned in the annular space and powered by the power source.

18. The system of claim 1, further comprising at least one magnetic dipole source antenna positioned in the annular space and powered by the power source.

19. The system of claim 1, wherein the computer derives a multidimensional model of formation resistivity or conductivity based at least in part on said received optical signals to track a flood front location as a function of time.

20. A formation monitoring method that comprises:
    injecting a first fluid into a reservoir formation;
    producing a second fluid from the reservoir formation via a casing in a borehole;

collecting electromagnetic field measurements with an array of fiberoptic sensors in an annular space between said casing and said borehole, said array communicating measurements to a surface interface via one or more fiberoptic cables; and operating on said measurements to locate a front between the first and second fluids.

21. The method of claim 20, further comprising repeating said collecting and operating to track the front as a function of time.

22. The method of claim 20, further comprising reducing production from one or more zones upon detecting said front near said borehole.

23. The method of claim 20, further comprising reducing injection into one or more zones upon detecting said front near said borehole.

24. The method of claim 20, further comprising injecting an electrical current into the reservoir formation via said casing.

25. The method of claim 20, further comprising generating an electromagnetic field via an electrical dipole source in said annular space.

26. The method of claim 20, further comprising generating an electromagnetic field via a magnetic dipole source in said annular space.

* * * * *